Patented Dec. 29, 1936

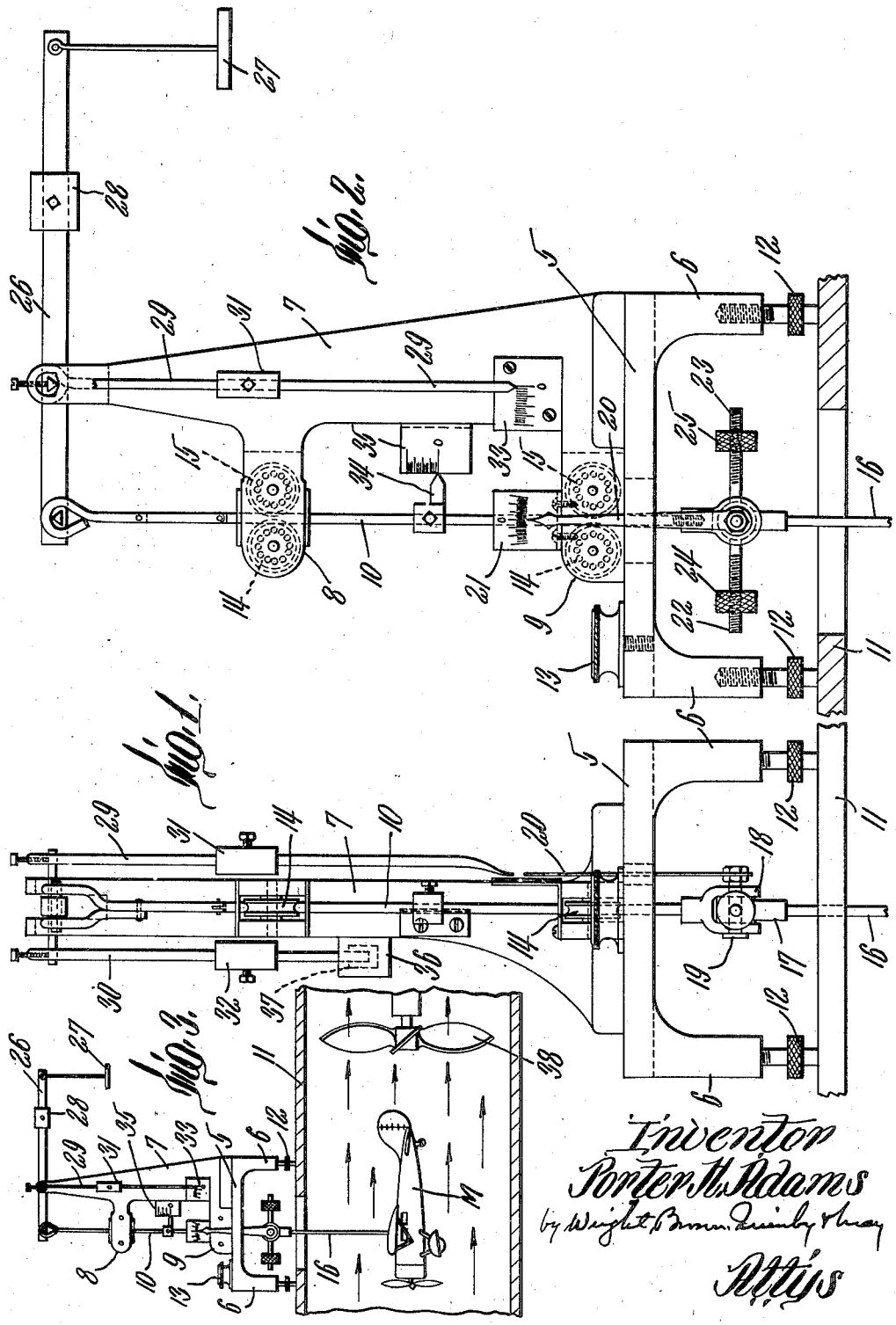

2,065,496

UNITED STATES PATENT OFFICE 2,065,496

WIND TUNNEL BALANCE

Porter H. Adams, Thetford, Vt.

Application December 4, 1933, Serial No. 700,798

6 Claims. (Cl. 265—23)

The present invention is an instrument designed to be used for measuring and indicating the wind resistance, and lift or depression due to a current of air, of models of airplanes, airplane wings, automobiles, railroad engines and trains, and anything else of which it is desired to study the effects of air pressure consequent on relative movement between the object and the air of the atmosphere. It is adapted to measure these effects both qualitatively, as by comparison of different models in like circumstances, and quantitatively. The illustrated embodiment of the invention is designed particularly for use in connection with a wind tunnel to rest on the top wall or cover of the tunnel and to suspend the model being studied through an opening in such top wall, and comprises movable indicators in connection with the suspension means disposed to measure the extent of horizontal and vertical movements of the model due to impingement of air flowing through the tunnel, together with counter-poises adjustable to balance models of different weights, areas and surface contours, and to afford a measure of the horizontal and vertical components on the model of the impinging air stream.

In thus defining the general characteristics of the form of instrument here illustrated, I have not intended to indicate limitations as to the manner and circumstances of its use. The invention comprehends generically the combination of means for supporting any model capable of being studied by its use in exposure to a current of air, whether flowing in a wind tunnel or elsewhere, coupled with provisions permitting movement of the model either horizontally or vertically, or in both directions, indicators measuring the extent of such movements, and provisions for applying counterbalancing forces of known values. More specifically the invention includes accessories and details hereinafter described.

In the drawing,—

Fig. 1 is a front elevation, and Fig. 2 a side elevation of one form of balance instrument embodying this invention, and shown here in illustration not only of the general principles of the invention, but also of details which I have found useful and valuable in practice;

Fig. 3 is a diagrammatic view illustrating the use of the invention, showing a fragment of wind tunnel in longitudinal section, with my balance instrument mounted on top of the tunnel and suspending a model airplane in the air stream in the interior of the tunnel.

Like reference characters designate the same parts wherever they occur in all the figures.

Describing now the specific instrument here illustrated, in detail, but without intending thereby to restrict the scope of the invention and the protection which I purpose to secure for it, otherwise than as required by the appended claims when interpreted with reference to the prior art, the instrument comprises a base 5 having legs 6, and a column 7 provided with guides 8 and 9 in which a rod 10, constituting a support for test models, is arranged to move endwise. The instrument is intended to be placed on the top or cover wall of a wind tunnel 11, and its legs are provided with adjustable feet 12, each of which may be adjusted independently of the others in a vertical direction so as to bring the rod 10 into a vertical position. A spirit level 13 is mounted on the top of the base in such relation to the rod as to show when the latter is vertical. This relation is most conveniently obtained by making the top face of the base perpendicular to the alinement of the rod guides 8 and 9, and mounting the spirit level flat on such surface. The feet 12 are made as screws seated in vertical tapped holes opening into the legs from their lower ends. The rod guides 8 and 9 are brackets projecting to one side of the column 7, in each of which are two rollers 14 and 15 mounted on ball-bearings and grooved on the circumference so as to embrace the rod closely and permit its movement with a minimum of friction.

The model to be studied, shown at M in Fig. 3, is suspended in the middle of the tunnel from the rod 10 by a suspender 16. A pivot or hinge connection is provided between the rod 10 and suspender 16 arranged to permit horizontal movement of the model in either direction lengthwise of the tunnel. This hinge connection is composed of a lug or eye 17 and a fork 18, one of which is detachably screwed on the lower end of rod 10 and to the other of which the upper end of the suspender 16 is detachably screwed, and a pivot 19 passing through this lug and the embracing arms of the fork. The pivot is made fast in lug 17, that is, the suspender-connected member of the hinge, and turns in the fork 18, preferably in a ballbearing. It is at right angles to the suspender 16 and to the length of the tunnel. An index 20 is made fast to one end of the pivot and projects upward through a slot in the base 5 beside a scale plate 21 mounted on the bracket 9 and bearing graduations of any character suitable for giving the information sought. Arms 22 and 23 rigid with the lug 17, project to opposite sides of the pivot and carry adjustable weights 24 and 25 respectively. These weights may be shifted independently on their arms toward and away from the pivot axis, and may be substituted by others of greater or less mass, or removed without substitution, so as to exert resistance of known value to horizontal displacement of the model by the air stream, or to measure the difference between pressure and friction effects of the air on different models. Of course the suspender 16 is sufficiently rigid to transmit motion and be not sensibly distorted by the forces applied to it.

The rod 10 is connected by any suitable linkage and pivots with one arm of a beam 26 which is pivoted at the upper end of the column 7. The other arm of the beam supports a suspended pan 27 on which weights may be placed, and an adjustable sliding weight 28; being thus similar to an ordinary scale beam. By means of these weights, the models of different weights may be counterbalanced. Two downwardly extending arms, 29 and 30, are secured to extensions of the pivot of beam 26, in a balanced arrangement on opposite sides of the column 7, and carry weights 31 and 32 which are adjustable vertically and serve to render the balance assemblage more stable and also to oppose displacement of the assemblage from its normal position by the lifting or depressing effect of air currents impinging on the model. One of these arms, as 29, is extended to serve as an indicator of vertical displacements of the model and to measure such displacements with reference to a scale plate 33 secured to the side of the column. Another indicator 34 for the same purpose is secured to the rod 10 in conjunction with a scale plate 35 attached to the column. Either of the indexes, 29 or 34, may be employed to the exclusion of the other.

In order further to avoid unsteadiness and fluttering of the balance assemblage, I may use a dashpot in connection with one of several parts of the assemblage. For illustration I have shown such a dashpot at 36 in Fig. 1 as being secured to the rear side of the column and receiving a vane 37 on the lower end of arm 30. The dashpot may be filled to a greater or less extent with any suitable damping liquid.

It will be readily appreciated from the foregoing description in connection with the drawing that my balance instrument may be used to measure and compare the effects of air currents on models of any shape and form, within the limits of weight and size for which the wind tunnel and balance are adapted. Thus, by means of the index 20, with suitable adjustment or substitution of the weights 24 and 25, the horizontal force of wind on the model, and its displacement by air currents of known velocity may be measured; while by either of the indexes 29, or 34, the lift of an airplane model by the air stream may be indicated. The lifting or depressing force of the wind is measured by the shifting of weight 28 along the scale beam 26, or by the weights needed to be removed from or placed on the pan 27 to bring these indexes into the same position with respect to their scales which they occupied when the model was balanced in the absence of air flow through the tunnel.

By shifting one of the weights 24 or 25 toward the pivot 19 and the other away from the pivot, the angle of incidence of the model to the air stream may be changed, thus permitting measurement of the lift under different angles of attack. As these weights are external to the tunnel they can be adjusted while the air stream is flowing. The position of the index 20 with respect to scale 21 is then a measure of the angle of attack, which remains the same while the air velocity remains constant. Comparisons of the pressure and friction effects of air on different models, and under different velocities on the same model are made either by noting the deflections of the index 20 or by adjusting the weights 24 and 25, or their equivalent substitutes, so as to bring the index to the same point on the scale in different tests. The magnitudes of the weights and their moment arms may be changed as needed to bring the model into the same position after as before commencement of air flow, thus counteracting the displacing force of the air stream; and the changes thus made measure the horizontal force component of the air on the model. Various other manipulations than those above suggested may be performed, wherefore it will be understood that this description of certain operations is not to be construed as setting the limits of utility of the apparatus.

I have shown a wind tunnel in a conventional manner in Fig. 3, together with a fan or propeller 38 for inducing air flow. This typifies any means for causing flow of air in a given direction at controlled speed. The instrument may, however, be used in the open air if desired. It is within my contemplation also to utilize the principles of this invention in means for measuring horizontal and vertical movements, and the forces acting to produce such movements, with other arrangements and combinations of the essential parts than those here illustrated.

I claim:

1. A balance instrument comprising a base having a column, vertically alined guides on said column, an endwise movable rod engaged with said guides, a model suspender hinged to the lower end of said rod and having horizontal arms at opposite sides of the hinge, adjustable, removable weights on said arms, and counterpoise means connected with said rod to balance the combined weight of the rod, the suspender with its associated weights, and the test model carried by the suspender.

2. A balance instrument comprising a base having a column, vertically alined guides on said column, an endwise movable rod engaged with said guides, a model suspender hinged to the lower end of said rod and having horizontal arms at opposite sides of the pivot, adjustable, removable weights on said arms, counterpoise means connected with said rod to balance the combined weight of the rod, the suspender with its associated weights, and the test model carried by the suspender, and a pivoted arm in operative connection with the rod so as to be displaced against the resistance of gravity from a normal pendent position when the rod is displaced from a given position.

3. An instrument for showing the effect of flowing air on a model comprising a base having legs adapted to be placed on the roof of an air tunnel, a suspender in pivotal connection with said base adapted to extend through such roof into the tunnel when the base is so located, and to carry a test model at its lower end, the pivot axis of the suspender being horizontal when located as set forth, complemental index and scale elements, one of which is mounted on the base and the other is connected to the suspender, and both being related to one another so as to indicate the angular displacement of the suspender and model effected by an air stream in the tunnel.

4. An instrument for showing the effect of flowing air on a model, comprising a base having legs adapted to be placed on the roof of an air tunnel, a suspender in pivotal connection with said base adapted to extend through such roof into the tunnel when the base is so located, and to carry a test model at its lower end, the pivot axis of the suspender being horizontal when located as set forth, complemental index and scale elements, one of which is mounted on the base and the other is connected to the suspender, and both being related to one another so as to indicate the angular displacement of the suspender and model effected by an air stream in the tunnel, an arm rigid with the suspender extending transversely thereto and to the pivot axis, and a weight adjustably positioned on said arm.

5. A balance instrument comprising a base having supporting legs and an upright column, guides supported by the base and column at one side of the latter, one guide being above the other, an endwise movable rod contained in said guides, means for suspending a model to be tested from the rod below the base, a beam pivoted on the column, having pivot extensions and arms at opposite sides of its pivot axis, one of said arms being connected to the rod, and weighted arms secured to and depending from each of said pivot extensions.

6. A balance instrument comprising a base having supporting legs and an upright column, guides supported by the base and column at one side of the latter, one guide being above the other, an endwise movable rod contained in said guides, means for suspending a model to be tested from the rod below the base, a beam pivoted on the column, having pivot extensions and arms at opposite sides of its pivot axis, one of said arms being connected to the rod, and weighted arms secured to and depending from each of said pivot extensions, one of the last named arms having an index.

PORTER H. ADAMS.